US012607751B2

(12) United States Patent
Braley et al.

(10) Patent No.: US 12,607,751 B2
(45) Date of Patent: Apr. 21, 2026

(54) SENSOR AND ENVIRONMENTAL EVALUATION FOR VEHICLES

(71) Applicant: WAYMO LLC, Mountain View, CA (US)

(72) Inventors: Colin Braley, Mountain View, CA (US); Antonio Teran Espinoza, Cambridge, MA (US); William Baxter, Kirkland, WA (US); Michael Marx, Mountain View, CA (US); Luke Wachter, Berkeley, CA (US)

(73) Assignee: Waymo LLC, Mountain View, CA (US)

( * ) Notice: Subject to any disclaimer, the term of this patent is extended or adjusted under 35 U.S.C. 154(b) by 161 days.

(21) Appl. No.: 18/372,454

(22) Filed: Sep. 25, 2023

(65) Prior Publication Data

US 2025/0102679 A1    Mar. 27, 2025

(51) Int. Cl.
 G01S 17/931 (2020.01)
 B60S 1/56 (2006.01)
 B60W 60/00 (2020.01)
 G01S 7/497 (2006.01)

(52) U.S. Cl.
 CPC ......... G01S 17/931 (2020.01); B60W 60/001 (2020.02); G01S 7/497 (2013.01); B60S 1/56 (2013.01); B60W 2420/408 (2024.01); B60W 2556/40 (2020.02); G01S 2007/4977 (2013.01)

(58) Field of Classification Search
 CPC ................... G01S 7/4808; G01S 7/497; G01S 2007/4975; G01S 2007/4977; G01S 17/06; G01S 17/46; G01S 17/48; G01S 17/89; G01S 17/90; G01S 17/931; B60W 60/001; B60W 2400/00; B60W 2420/408; B60W 2554/20; B60W 2554/801; B60W 2554/802; B60W 2556/40; G06V 10/40; G06V 10/60; B60S 1/02; B60S 1/60; B60S 1/56
See application file for complete search history.

(56) References Cited

U.S. PATENT DOCUMENTS

| | | | |
|---|---|---|---|
| 9,274,525 B1 * | 3/2016 | Ferguson | B60W 10/18 |
| 11,067,676 B2 | 7/2021 | Yang et al. | |
| 11,226,398 B2 | 1/2022 | Retterath et al. | |
| 11,402,509 B2 | 8/2022 | Cop et al. | |
| 2011/0012773 A1 * | 1/2011 | Cunning | G01S 7/6245 342/52 |

(Continued)

FOREIGN PATENT DOCUMENTS

| | | | | |
|---|---|---|---|---|
| WO | WO-2014168851 A1 * | 10/2014 | | B60W 30/00 |

*Primary Examiner* — Erin D Bishop
*Assistant Examiner* — Brandon Z Willis
(74) *Attorney, Agent, or Firm* — Botos Churchill IP Law

(57) ABSTRACT

Aspects of the disclosure provide for controlling behaviors of autonomous vehicles based on evaluation of sensors of those vehicles. For instance, sensor data including distance and intensity information for a point in an environment of an autonomous vehicle may be received. An expected intensity value from a pre-stored fair weather reference map may be identified based on a location of the point. An effective detection range for the sensor may be dynamically determined based on the expected intensity and the intensity information for the point. A behavior of the autonomous vehicle may be controlled based on the effective detection range.

19 Claims, 12 Drawing Sheets

910 — Receive sensor data generated by a sensor of a perception system, the sensor data including distance and intensity information for a point in an environment of an autonomous vehicle 920 — Identify an expected intensity value from a pre-stored fair weather reference map 930 — Dynamically determine an effective detection range for the sensor based on the expected intensity and the intensity information for the point 940 — Control the vehicle in the autonomous driving mode based on the effective detection range

900

(56) References Cited

U.S. PATENT DOCUMENTS

| | | | |
|---|---|---|---|
| 2016/0025627 A1* | 1/2016 | Stopper | G01N 21/538 |
| | | | 356/337 |
| 2019/0009752 A1* | 1/2019 | Rice | B60S 1/56 |
| 2021/0325520 A1* | 10/2021 | Cai | B32B 33/00 |
| 2022/0009498 A1* | 1/2022 | Mallik | G06V 10/774 |
| 2022/0204019 A1 | 6/2022 | Lauterbach et al. | |
| 2024/0219535 A1* | 7/2024 | Jacob | G01M 17/007 |

* cited by examiner

110 Computing Device(s)
120 Processor(s)
130 Memory
132 Data
134 Instructions
150 User Input
152 Internal Electronic Display
154 Speakers
156 Wireless Network Connection(s)

160 Deceleration System
162 Acceleration System
164 Steering System
166 Signaling System
168 Forward Planning System
170 Routing System
172 Positioning System
174 Perception System
176 Behavior Modeling System
178 Power System (Engine)

100

200

400

700

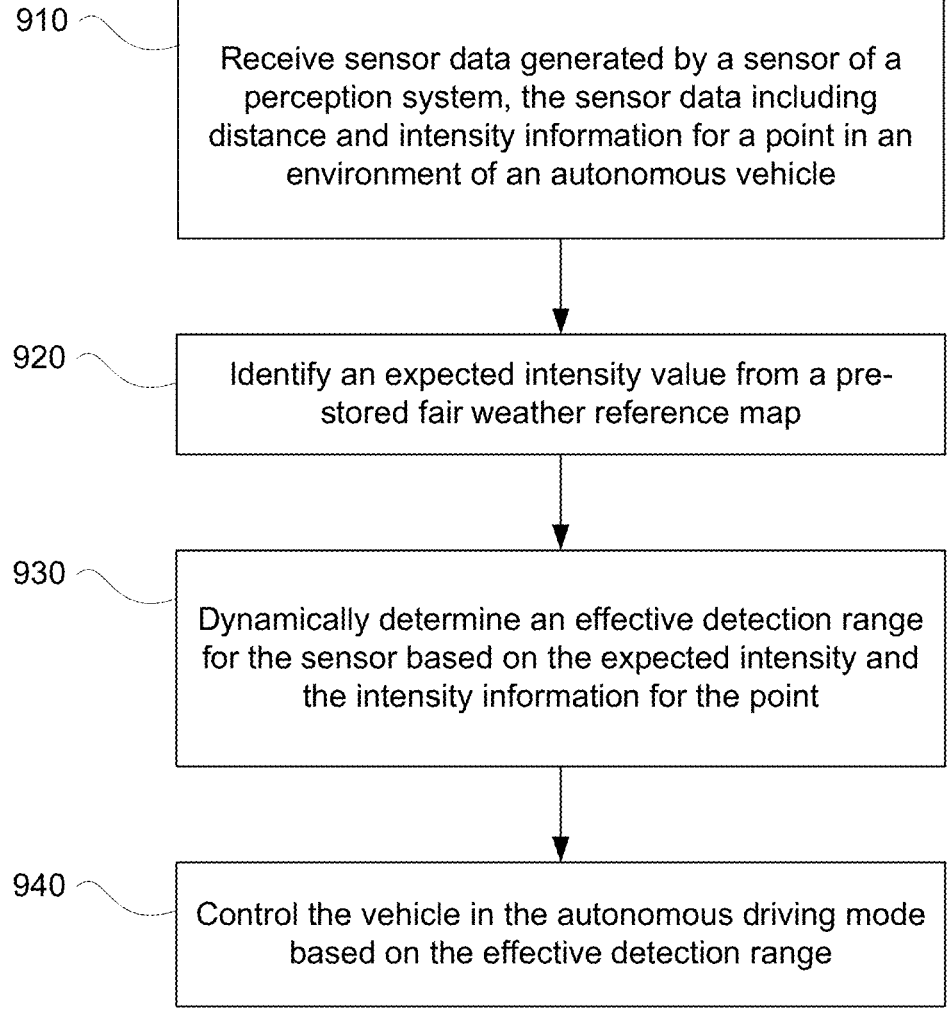

910 — Receive sensor data generated by a sensor of a perception system, the sensor data including distance and intensity information for a point in an environment of an autonomous vehicle 920 — Identify an expected intensity value from a pre-stored fair weather reference map 930 — Dynamically determine an effective detection range for the sensor based on the expected intensity and the intensity information for the point 940 — Control the vehicle in the autonomous driving mode based on the effective detection range

SENSOR AND ENVIRONMENTAL EVALUATION FOR VEHICLES

BACKGROUND

Autonomous vehicles for instance, vehicles that may not require a human driver, can be used to aid in the transport of passengers or items from one location to another. Such vehicles may operate in a fully autonomous mode where passengers may provide some initial input, such as a pickup or destination location, and the autonomous vehicle maneuvers itself to that location. Autonomous vehicles are equipped with various types of sensors in order to detect objects in the surroundings. For example, autonomous vehicles may include sonar, radar, camera, lidar, and other devices that scan, generate and/or record data about the vehicle's surroundings. This data may be combined with pre-stored map information in order to enable the autonomous vehicle to plan trajectories in order to maneuver itself through the surroundings.

BRIEF SUMMARY

Aspects of the disclosure provide a method. The method includes receiving, by one or more processors, sensor data generated by a sensor of a perception system of an autonomous vehicle, the sensor data including distance and intensity information for a point in an environment of the autonomous vehicle; identifying, by the one or more processors, an expected intensity from a pre-stored fair weather reference map based on a location of the point; dynamically determining, by the one or more processors, an effective detection range of the sensor based on at least the expected intensity and the intensity information for the point; and controlling, by the one or more processors, a behavior of the autonomous vehicle based on the effective detection range.

In one example, the sensor is a LIDAR sensor. In another example, the pre-stored fair weather reference map includes surfels corresponding to surfaces of buildings. In this example, the pre-stored fair weather reference map includes surfels corresponding to surfaces which are generally vertical. In addition or alternatively, the pre-stored fair weather reference map includes surfels corresponding to surfaces which are planar. In addition or alternatively, the pre-stored fair weather reference map includes surfels corresponding to surfaces which are generally Lambertian. In another example, the method also includes determining an aperture transmission value based on the expected intensity and the intensity information for the point; comparing the aperture transmission value to a threshold value; and based on the comparison, activating a cleaning process for the sensor. In another example, the method also includes, based on the expected intensity and the intensity information for the point, determining a meteorological optical range value for the point, and wherein determining the effective detection range is further based on the meteorological optical range value. In this example, the method also includes generating a meteorological optical range map based on the meteorological optical range value and at least one other meteorological optical range value, and wherein controlling the behavior of the vehicle is further based on the meteorological optical range map. In another example, the effective detection range represents a distance at which the sensor can detect and identify objects to a certain threshold minimum. In another example, the method also includes determining an updated effective detection range based on updated sensor data.

Another aspect of the disclosure provides a system comprising one or more processors. The one or more processors are configured to receive sensor data generated by a sensor of perception system of an autonomous vehicle, the sensor data including distance and intensity information for a point in an environment of the autonomous vehicle; identify an expected intensity from a pre-stored fair weather reference map based on a location of the point; dynamically determine an effective detection range for the sensor based on the expected intensity and the intensity information for the point; and control a behavior of the autonomous vehicle in the autonomous driving mode based on the effective detection range.

In one example, the pre-stored fair weather reference map includes surfels corresponding to surfaces of buildings. In addition, the pre-stored fair weather reference map includes surfels corresponding to surfaces which are generally vertical. In addition or alternatively, the pre-stored fair weather reference map includes surfels corresponding to surfaces which are planar. In addition or alternatively, the pre-stored fair weather reference map includes surfels corresponding to surfaces which are generally Lambertian. In another example, the one or more processors are further configured to determine an aperture transmission value based on the expected intensity and the intensity information for the point, compare the aperture transmission value to a threshold value, and control the behavior includes activating a cleaning process for the sensor based on the comparison. In another example, the one or more processors are further configured to, based on the expected intensity and the intensity information for the point, determining a meteorological optical range value for the point, and to further determine the effective detection range is further based on the meteorological optical range value. In this example, the one or more processors are further configured to generate a meteorological optical range map based on the meteorological optical range value and at least one other meteorological optical range value, and wherein controlling the behavior of the autonomous vehicle is further based on the meteorological optical range map. In another example, the meteorological optical range value represents a distance at which the sensor can detect and identify objects to a certain threshold minimum.

BRIEF DESCRIPTION OF THE DRAWINGS

FIG. 9 is a flow diagram in accordance with aspects of the disclosure.

DETAILED DESCRIPTION

Overview

Figure 1:
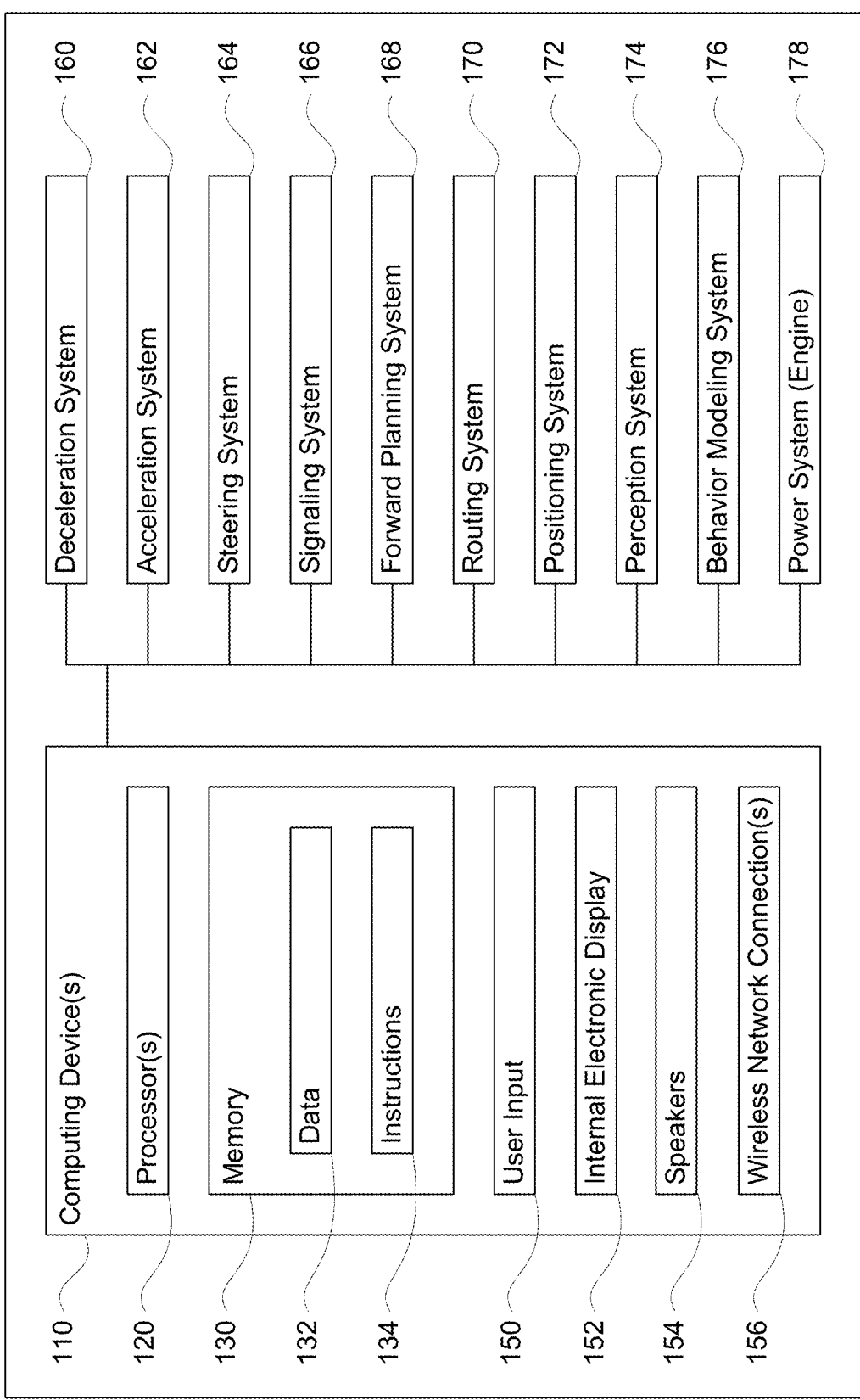
FIG. 1 is a functional diagram of an example vehicle in accordance with an exemplary embodiment.

The technology relates to sensor and environmental evaluations for vehicles, and in particular, for vehicles having an autonomous driving mode (or "autonomous vehicles"). In some embodiments, a fair weather reference map and LIDAR intensity comparison framework may be used to dynamically determine an effective detection range of a sensor, such as a LIDAR sensor as well as current conditions in the sensor's environment. For instance, weather conditions in the environment of an autonomous vehicle may affect the effective detection range or the range at which a LIDAR sensor can reliably produce sensor data and therefore the range at which the autonomous vehicle's perception system can reliably detect and identify objects.

For instance, if an autonomous vehicle is attempting to make a particular maneuver, detecting objects at various distances is critical to safely completing such maneuvers. If no object is detected, this could potentially mean that the autonomous vehicle's LIDAR sensor is not able to detect an object due to fouling on an aperture of the sensor (e.g., due to dirt, dust, water, and/or other debris), atmospheric conditions, or atmospheric effects (e.g., fog precipitation, dust, steam, etc.) which are reducing the detection range (possibly over a subset of a field of view) of the LIDAR sensor. Moreover, as weather conditions change (clear to foggy, foggy to clear, etc.) resulting in fouling conditions (wet to dry, dry to wet, clean to debris, etc.), the detection range of each LIDAR sensor of the autonomous vehicle may change and may change quickly.

To address this, the state of fouling on an aperture of each LIDAR sensor as well as atmospheric effects on each LIDAR sensor may be estimated and then used to determine an effective detection range of each LIDAR sensor. The effective detection range may correspond to a distance at which a particular LIDAR sensor meets certain threshold minimums. In order to do the aforementioned comparisons, a fair weather reference map may be generated. This may involve processing log data collected by LIDAR sensors of an autonomous vehicle through a geographic area during clear conditions where there is no fog, precipitation or other atmospheric or aperture fouling effects. The fair weather reference map may be generated using LIDAR returns and may thus include a three-dimensional (3D) geometric map that can associate intensity information with a location in 3D space.

As an autonomous vehicle drives through the world, its perception system may collect data about its environment. For example, the perception system may include one or more LIDAR sensors which generate LIDAR sensor data or LIDAR returns. The distance and intensity values for the LIDAR returns may be compared to a fair weather reference map corresponding to the geographic area in which the autonomous vehicle is currently driving. The comparison may be used to compute differences between the intensity values and the fair weather reference map. The differences may be used to estimate aperture fouling levels and the meteorological optical range value of each LIDAR sensor. The aperture fouling levels may correspond to an aperture transmission value for a given point in time. The meteorological optical range value may be defined as a distance and may range from 0 to infinity. This distance may be a proxy value for how fog or other atmospheric conditions affect a LIDAR sensor and may vary much more slowly than the aperture transmission value, such as over tens of seconds.

The combination of aperture transmission values and the meteorological optical range values may be used to estimate how much the overall intensity attenuation is expected at a given point in time and distance from the LIDAR sensor. On a clear day with an unfouled, dry aperture, the overall intensity attenuation would be expected to be close to some minimum or even zero. If the aperture is dirty or wet or the weather conditions are not clear, the overall intensity attenuation would be expected to be some minimum non-zero value, assuming that at least some light is received.

Each LIDAR return may provide information such as location of a point on a surface from which the light pulse was reflected, the intensity for the point, a timestamp, a range or distance from the LIDAR sensor to the point, and an angle of incidence. In this regard, the intensity value may represent the amount of light reflected from a surface at that point or the reflectivity of that surface. Based on the distance and location, a corresponding location (e.g., a surfel of the map information) and associated intensity may be identified from the fair weather reference map. The angle of incidence may also be used to determine the angle of the light pulse relative to the location's surface normal. For each LIDAR return, the associated surface intensity should approximately equal the intensity for the point after compensating for the overall intensity attenuation.

A point to surfel relationship may then be defined. This relationship may represent an approximation as intensity measurements can be noisy and exhibit channel-to-channel bias. A point to point relationship may also be defined. A voxel grid of some larger dimension may be used to accumulate LIDAR returns and identify correspondences for a given LIDAR sensor or sensors. In order to solve for the aperture transmission value and meteorological optical range value over a given interval of time an objective function that utilizes these relationships may be used. In some instances, the meteorological optical range value may be converted to a single scalar value for an entire scene or a full scalar field. The single scalar value may be less useful as it essentially assumes that the autonomous vehicle is operating in homogenous atmospheric conditions. The scalar field may provide the meteorological optical range value at any three-dimensional point in the scene.

The features described herein may provide a framework that may be used to estimate the state of a sensor, and in particular a LIDAR, and its environment dynamically or in real time. This may enable more precise identification of atmospheric conditions as well as aperture fouling levels, which in turn, may be used to improve safety while driving, better allocate resources for cleaning as well as to determine a range at which the autonomous vehicle's perception system can reliably detect and identify objects.

Example Systems

As shown in FIG. 1, an autonomous vehicle 100 in accordance with one aspect of the disclosure includes various components. Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the autonomous vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified different levels to indicate how much, or how little, a vehicle controls the driving, although different organizations may categorize the levels differently. Moreover, such classifications may change (e.g., be updated) overtime.

As described herein, in a semi or partially autonomous driving mode, even though the autonomous vehicle assists with one or more driving operations (e.g., steering, braking and/or accelerating to perform lane centering, adaptive cruise control or emergency braking), the human driver is expected to be situationally aware of the autonomous vehicle's surroundings and supervise the assisted driving operations. Here, even though the autonomous vehicle may perform all driving tasks in certain situations, the human driver is expected to be responsible for taking control as needed.

In contrast, in a fully autonomous driving mode, the control system of the autonomous vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode.

While certain aspects of the disclosure are particularly useful in connection with specific types of vehicles, the autonomous vehicle may be any type of vehicle including, but not limited to, cars, trucks (e.g. garbage trucks, tractor-trailers, pickup trucks, etc.), motorcycles, buses, recreational vehicles, street cleaning or sweeping vehicles, etc. The autonomous vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor 120. The memory 130 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs or GPUs. Alternatively, the one or more processors may include a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more of a button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, electronic display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 110 may be part of an autonomous control system for the autonomous vehicle 100 and may be capable of communicating with various components of the autonomous vehicle in order to control the autonomous vehicle in an autonomous driving mode. For example, returning to FIG. 1, computing devices 110 may be in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of autonomous vehicle 100 in accordance with the instructions 134 of memory 130 in the autonomous driving mode.

As an example, computing devices 110 may interact with deceleration system 160 and acceleration system 162 in order to control the speed of the autonomous vehicle. Similarly, steering system 164 may be used by computing devices 110 in order to control the direction of autonomous vehicle 100. For example, if autonomous vehicle 100 is configured for use on a road, such as a car or truck, steering system 164 may include components to control the angle of wheels to turn the autonomous vehicle. Computing devices 110 may also use the signaling system 166 in order to signal the autonomous vehicle's intent to other drivers or vehicles, for example, by lighting turn signals or brake lights when needed.

Routing system 170 may be used by computing devices 110 in order to generate a route to a destination using map information. Planning system 168 may be used by computing device 110 in order to generate short-term trajectories that allow the autonomous vehicle to follow routes generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device), pullover spots, vegetation, or other such objects and information.

Figure 2A:
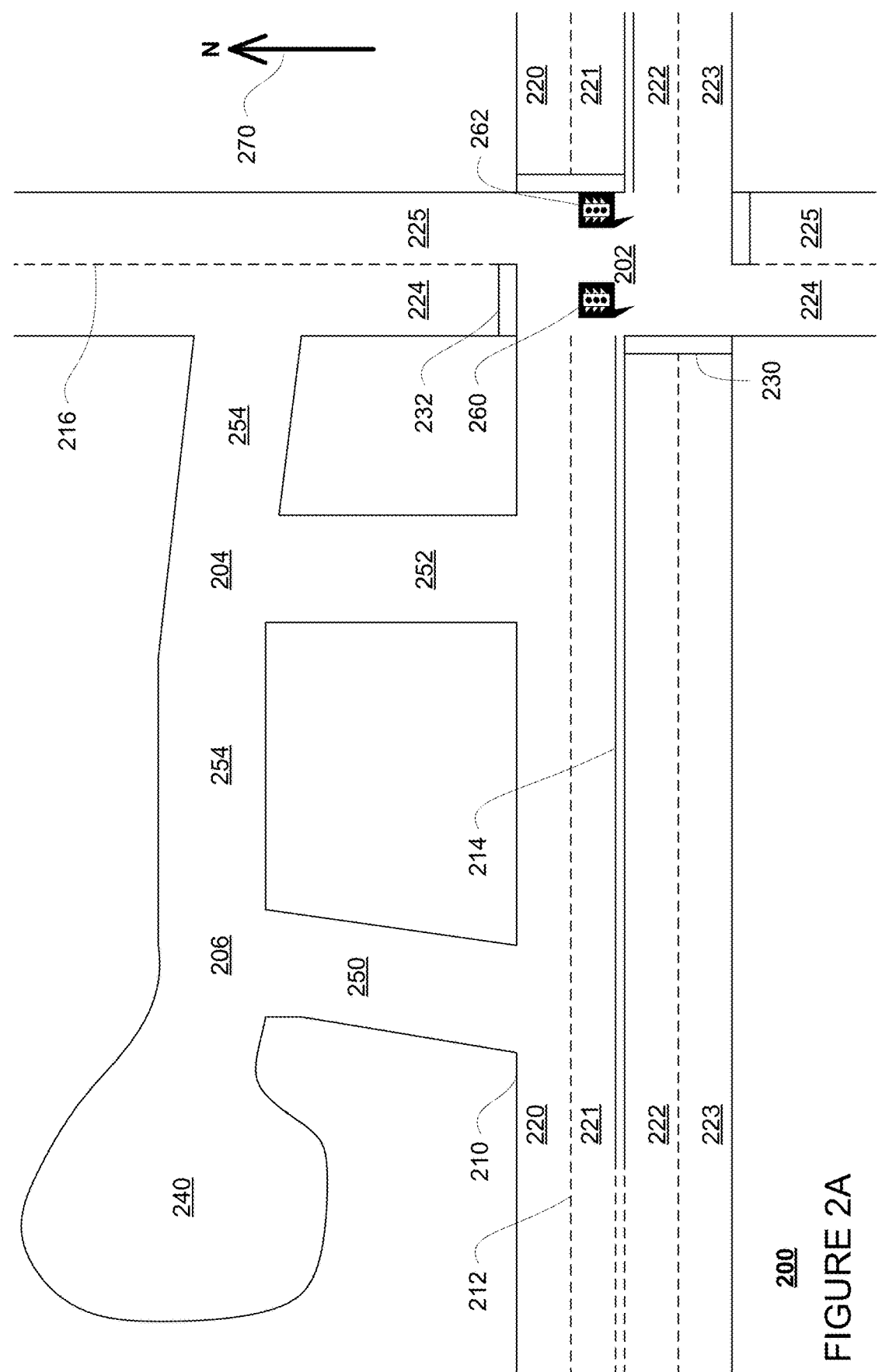
FIGS. 2A-2B are an example of map information in accordance with aspects of the disclosure.
Figure 2B:
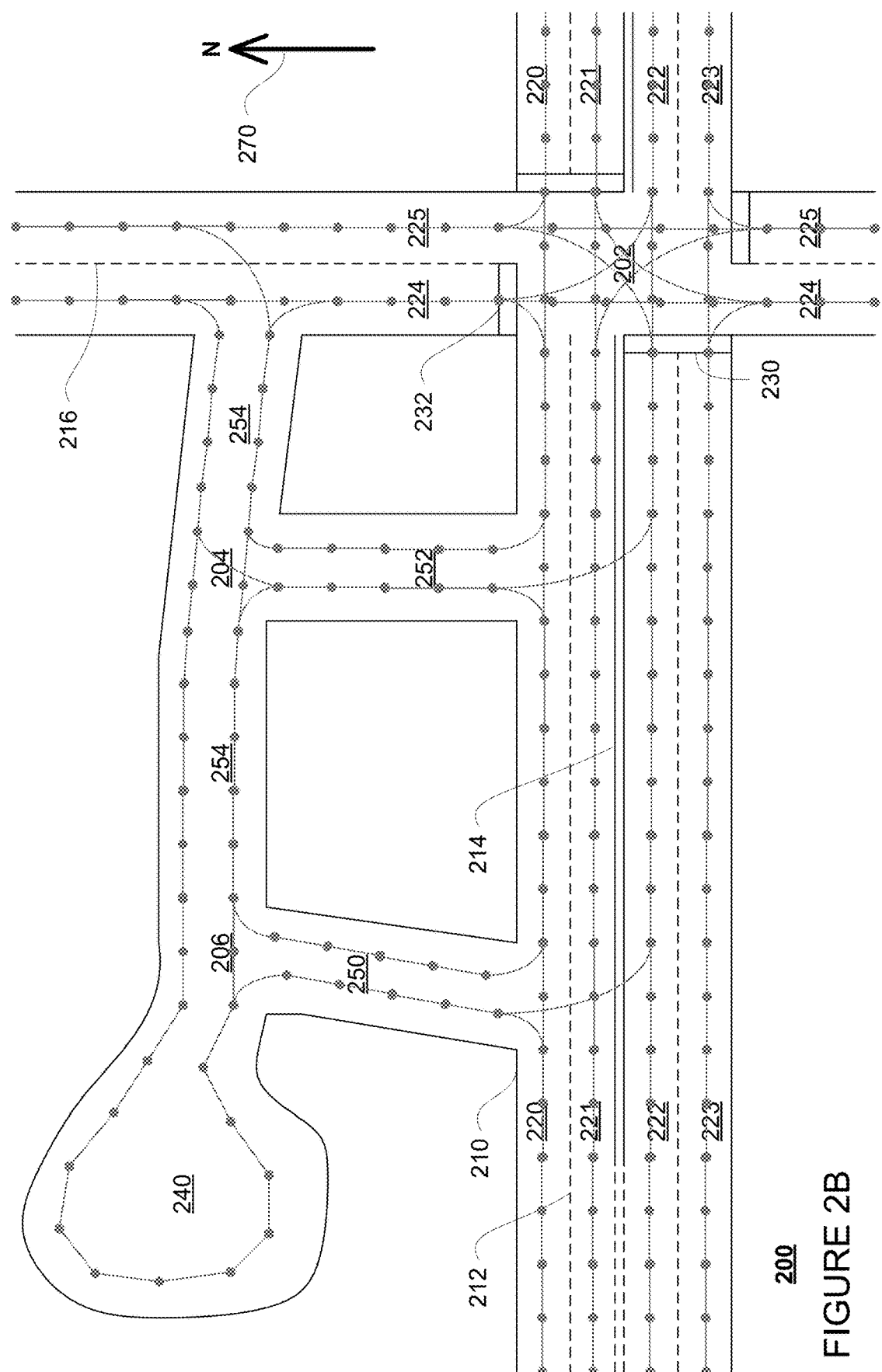

FIGS. 2A-2B are an example of map information 200 for a section of roadway including intersections 202, 204, 206. As identified in FIG. 2A depict a portion of the map information that includes information identifying the shape, location, and other characteristics of lane markers, lane lines curbs or other road edges 210, 212, 214, 216 which define the shape, location and other characteristics of lanes 220, 221, 222, 223, 224, 225, as well as stop lines 230, 232 and traffic control devices, such as traffic signal lights 260, 262. The map information also includes other types of drivable areas such as cul-de-sac 240 and side streets 250, 252, 254 which do not necessarily include lane lines but may allow for traffic to move in different directions. Arrow 270 provides a directional arrow for reference only and need not necessarily be included in the map information as such. However, in addition to these features, the map information may also include information that identifies the direction of traffic and speed limits for each lane or other drivable area as well as information that allows the computing devices 110 to determine whether the autonomous vehicle has the right of way to complete a particular maneuver (i.e. complete a turn or cross a lane of traffic or intersection), as well as other features such as buildings, waterways, vegetation, signs, etc.

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the autonomous vehicle 100 must be moving in in order to follow the edge (i.e. a direction of traffic flow). For example, FIG. 2B represents example nodes, represented by solid circles, as well as edges between those nodes, represented by the connecting lines between the solid circles. The nodes and edges of the map information 200 as depicted in FIG. 2B are merely an example configuration for the area of the map information. The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which edges or lanes or other mapped areas are drivable.

The routing system 166 may use the aforementioned map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the autonomous vehicle, etc. Each route may include a list of a plurality of nodes and edges which the autonomous vehicle can use to reach the destination. Routes may be recomputed periodically as the autonomous vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 170 may be used by computing devices 110 in order to determine the autonomous vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the autonomous vehicle. The location of the autonomous vehicle may include an absolute geographical location, such as latitude, longitude, and altitude, a location of a node or edge of the roadgraph as well as relative location information, such as location relative to other cars immediately around it, which can often be determined with less noise than the absolute geographical location.

The positioning system 172 may also include other devices in communication with computing devices 110, such as an accelerometer, gyroscope or another direction/speed detection device to determine the direction and speed of the autonomous vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the autonomous vehicle such as other road users (vehicles, pedestrians, bicyclists, etc.) obstacles in the roadway, traffic signals, signs, trees, buildings, etc. For example, the perception system 174 may include Lidars, sonar, radar, cameras, microphones and/or any other detection devices that generate and/or record data which may be processed by the computing devices of computing devices 110. In the case where the autonomous vehicle is a passenger vehicle such as a minivan or car, the autonomous vehicle may include Lidar, cameras, and/or other sensors mounted on or near the roof, fenders, bumpers or other convenient locations.

Figure 3A:
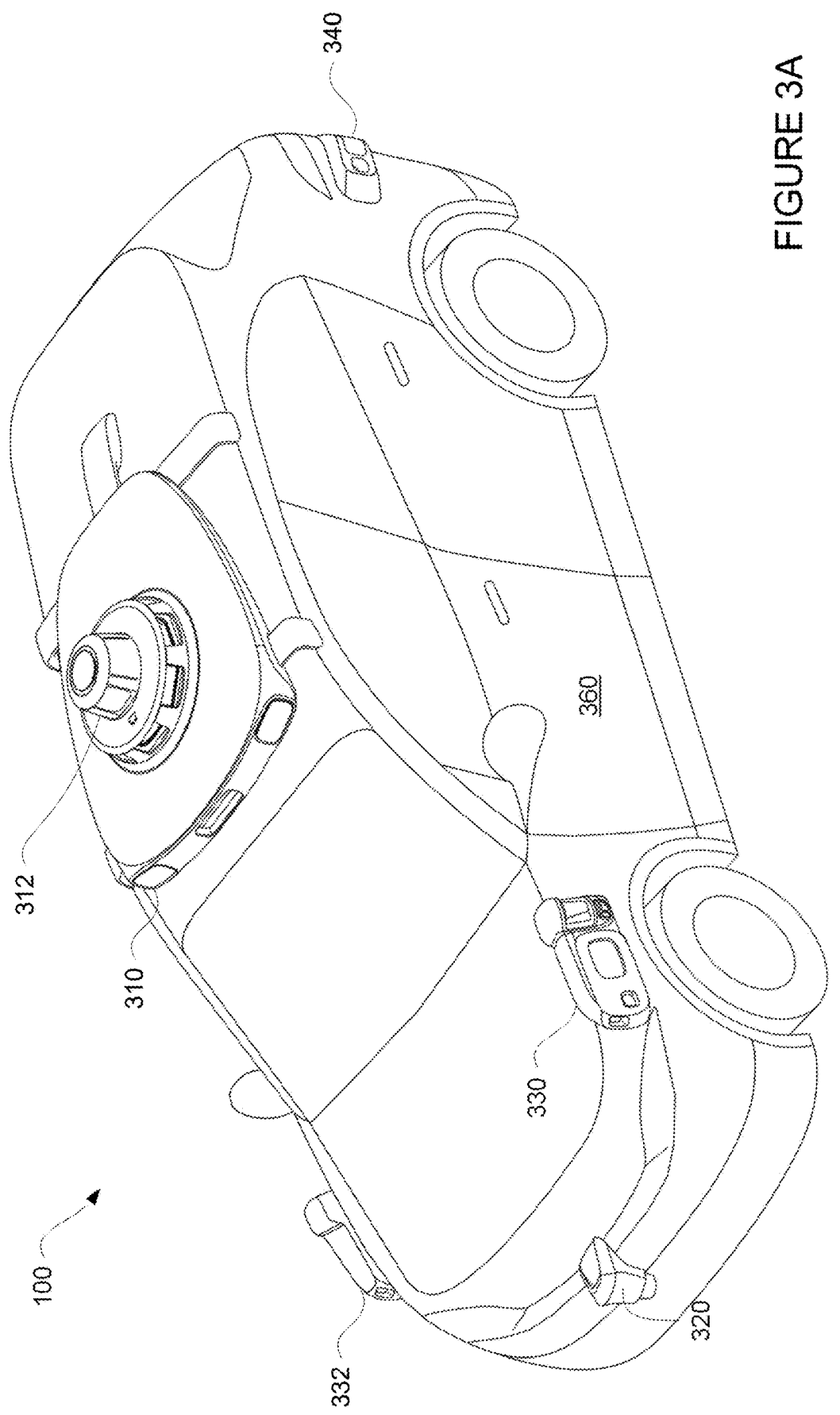
FIG. 3A-3B are example external views of a vehicle in accordance with aspects of the disclosure.
Figure 3B:
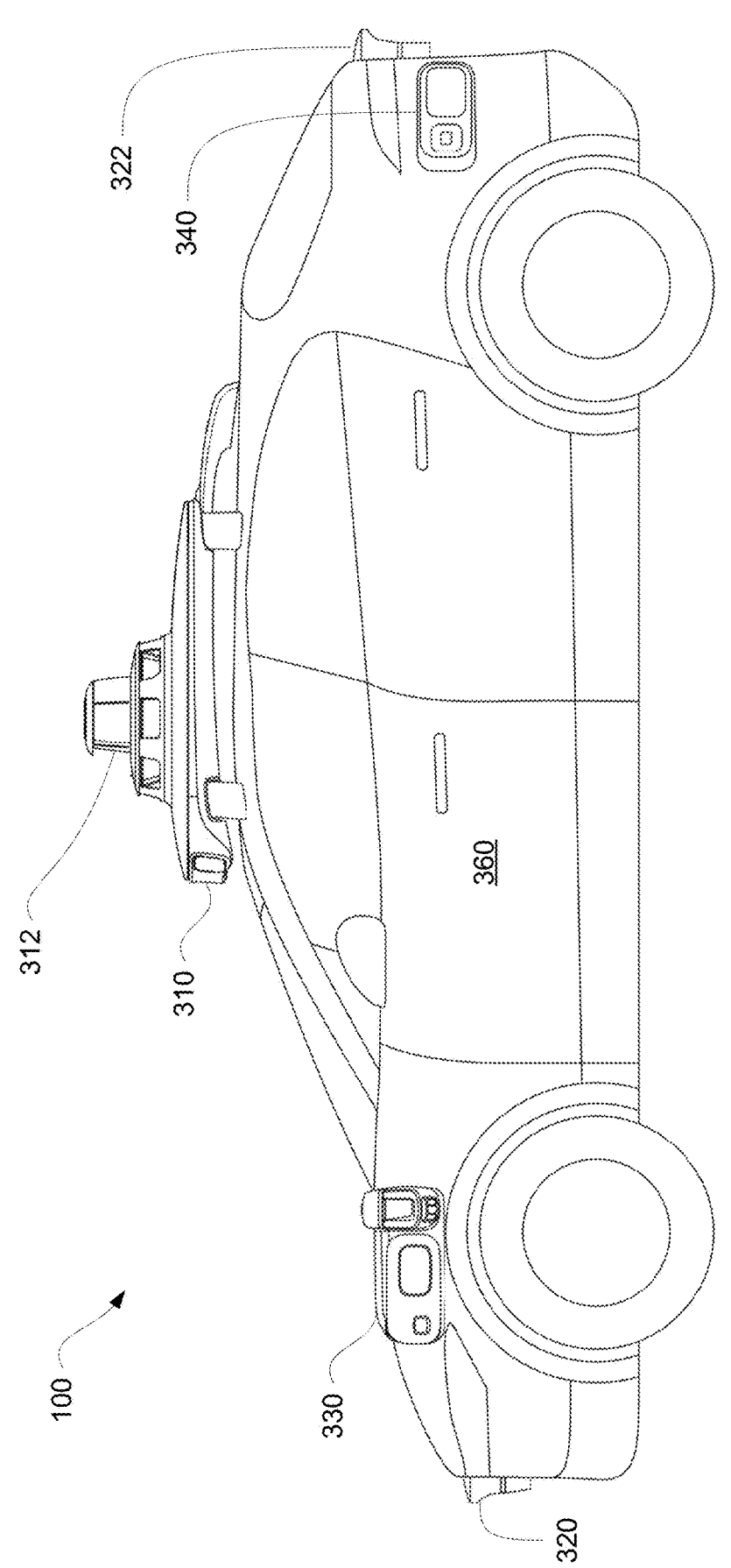

For instance, FIGS. 3A-3B are an example external views of autonomous vehicle 100. In this example, roof-top housing 310 and upper housing 312 may include a LIDAR sensor as well as various cameras and radar units. Upper housing 312 may include any number of different shapes, such as domes, cylinders, "cake-top" shapes, etc. In addition, housing 320, 322 (shown in FIG. 3B) located at the front and rear ends of autonomous vehicle 100 and housings 330, 332 on the driver's and passenger's sides of the autonomous vehicle may each store a Lidar sensor and, in some instances, one or more cameras. For example, housing 330 is located in front of driver door 360. Autonomous vehicle 100 also includes a housing 340 for radar units and/or cameras located on the driver's side of the autonomous vehicle 100 proximate to the rear fender and rear bumper of autonomous vehicle 100. Another corresponding housing (not shown may also be arranged at the corresponding location on the passenger's side of the autonomous vehicle 100. Additional radar units and cameras (not shown) may be located at the front and rear ends of autonomous vehicle 100 and/or on other positions along the roof or roof-top housing 310.

Computing devices 110 may be capable of communicating with various components of the autonomous vehicle in order to control the movement of autonomous vehicle 100 according to primary vehicle control code of memory of computing devices 110. For example, returning to FIG. 1, computing devices 110 may include various computing devices in communication with various systems of autonomous vehicle 100, such as deceleration system 160, acceleration system 162, steering system 164, signaling system 166, forward planning system 168, routing system 170, positioning system 172, perception system 174, behavior modeling system 176, and power system 178 (i.e. the autonomous vehicle's engine or motor) in order to control the movement, speed, etc. of autonomous vehicle 100 in accordance with the instructions 134 of memory 130.

The various systems of the autonomous vehicle may function using autonomous vehicle control software in order to determine how to control the autonomous vehicle. As an example, a perception system software module of the perception system 174 may use sensor data generated by one or more sensors of an autonomous vehicle, such as cameras, Lidar sensors, radar units, sonar units, etc., to detect and identify objects and their characteristics. These characteristics may include location, type, heading, orientation, speed, acceleration, change in acceleration, size, shape, etc.

In some instances, characteristics may be input into a behavior prediction system software module of the behavior modeling system 176 which uses various behavior models based on object type to output one or more behavior predictions or predicted trajectories for a detected object to follow into the future (e.g. future behavior predictions or predicted future trajectories). In this regard, different models may be used for different types of objects, such as pedestrians, bicyclists, vehicles, etc. The behavior predictions or predicted trajectories may be a list of positions and orientations or headings (e.g. poses) as well as other predicted characteristics such as speed, acceleration or deceleration, rate of change of acceleration or deceleration, etc.

In other instances, the characteristics from the perception system 174 may be put into one or more detection system software modules, such as a traffic light detection system software module configured to detect the states of known traffic signals, construction zone detection system software module configured to detect construction zones from sensor data generated by the one or more sensors of the autonomous vehicle as well as an emergency vehicle detection system configured to detect emergency vehicles from sensor data generated by sensors of the autonomous vehicle. Each of these detection system software modules may use various models to output a likelihood of a construction zone or an object being an emergency vehicle.

Detected objects, predicted trajectories, various likelihoods from detection system software modules, the map information identifying the autonomous vehicle's environment, position information from the positioning system 170 identifying the location and orientation of the autonomous vehicle, a destination location or node for the autonomous vehicle as well as feedback from various other systems of the autonomous vehicle may be input into a planning system software module of the planning system 168. The planning system 168 may use this input to generate planned trajectories for the autonomous vehicle to follow for some brief period of time into the future based on a route generated by a routing module of the routing system 170. Each planned trajectory may provide a planned path and other instructions for an autonomous vehicle to follow for some brief period of time into the future, such as 10 seconds or more or less. In this regard, the trajectories may define the specific characteristics of acceleration, deceleration, speed, direction, etc. to allow the autonomous vehicle to follow the route towards reaching a destination. A control system software module of computing devices 110 may be configured to control movement of the autonomous vehicle, for instance by controlling braking, acceleration and steering of the autonomous vehicle, in order to follow a trajectory.

The computing devices 110 may control the autonomous vehicle in one or more of the autonomous driving modes by controlling various components. For instance, by way of example, computing devices 110 may navigate the autonomous vehicle to a destination location completely autonomously using data from the detailed map information and planning system 168. Computing devices 110 may use the positioning system 170 to determine the autonomous vehicle's location and perception system 174 to detect and respond to objects when needed to reach the location safely. Again, in order to do so, computing device 110 and/or planning system 168 may generate trajectories and cause the autonomous vehicle to follow these trajectories, for instance, by causing the autonomous vehicle to accelerate (e.g., by supplying fuel or other energy to the engine or power system 178 by acceleration system 162), decelerate (e.g., by decreasing the fuel supplied to the engine or power system

178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the autonomous vehicle and the wheels of the autonomous vehicle. Again, by controlling these systems, computing devices 110 may also control the drivetrain of the autonomous vehicle in order to maneuver the autonomous vehicle autonomously.

Figure 4:
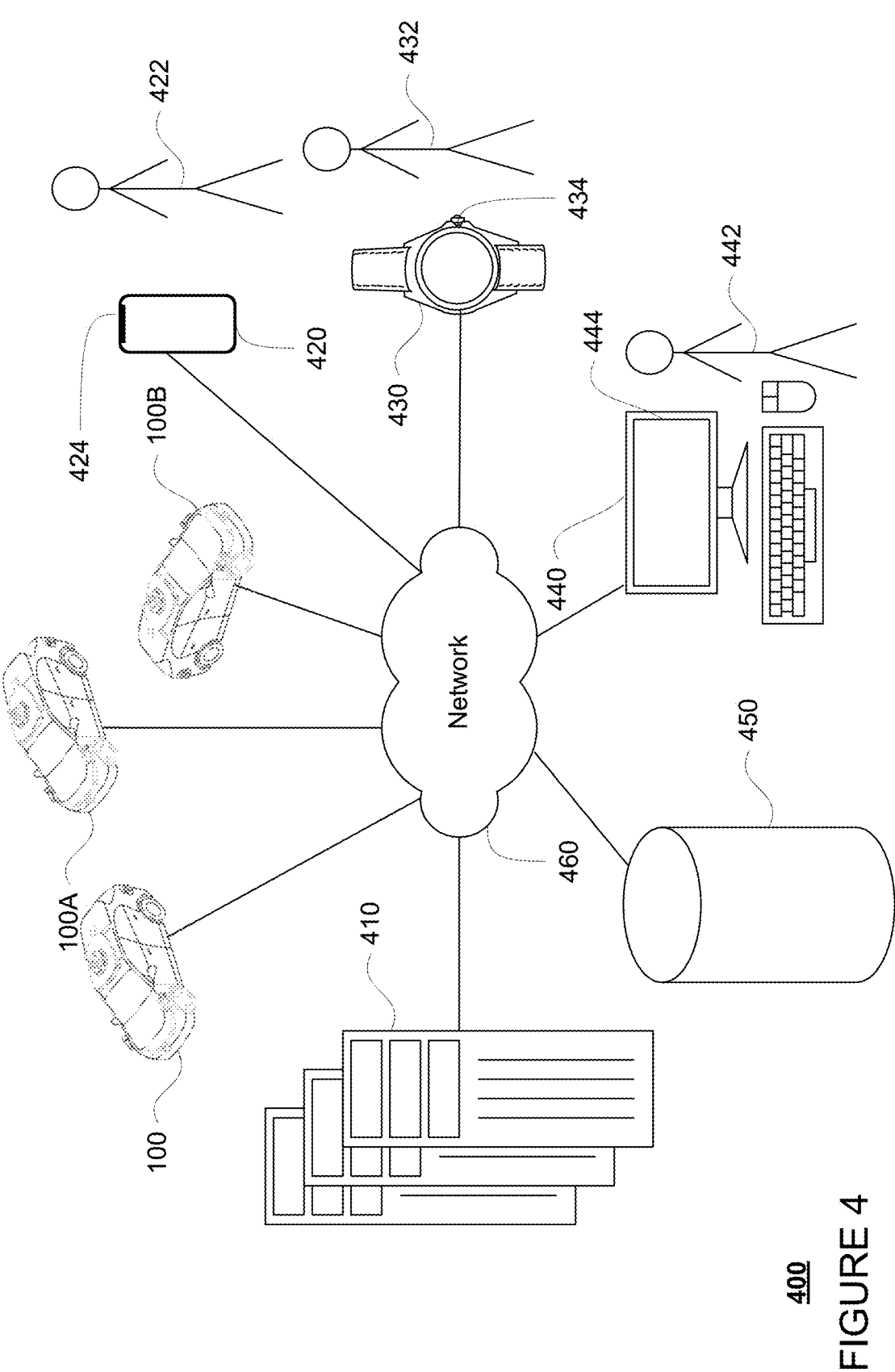
FIG. 4 is a pictorial diagram of an example system in accordance with aspects of the disclosure.
Figure 5:
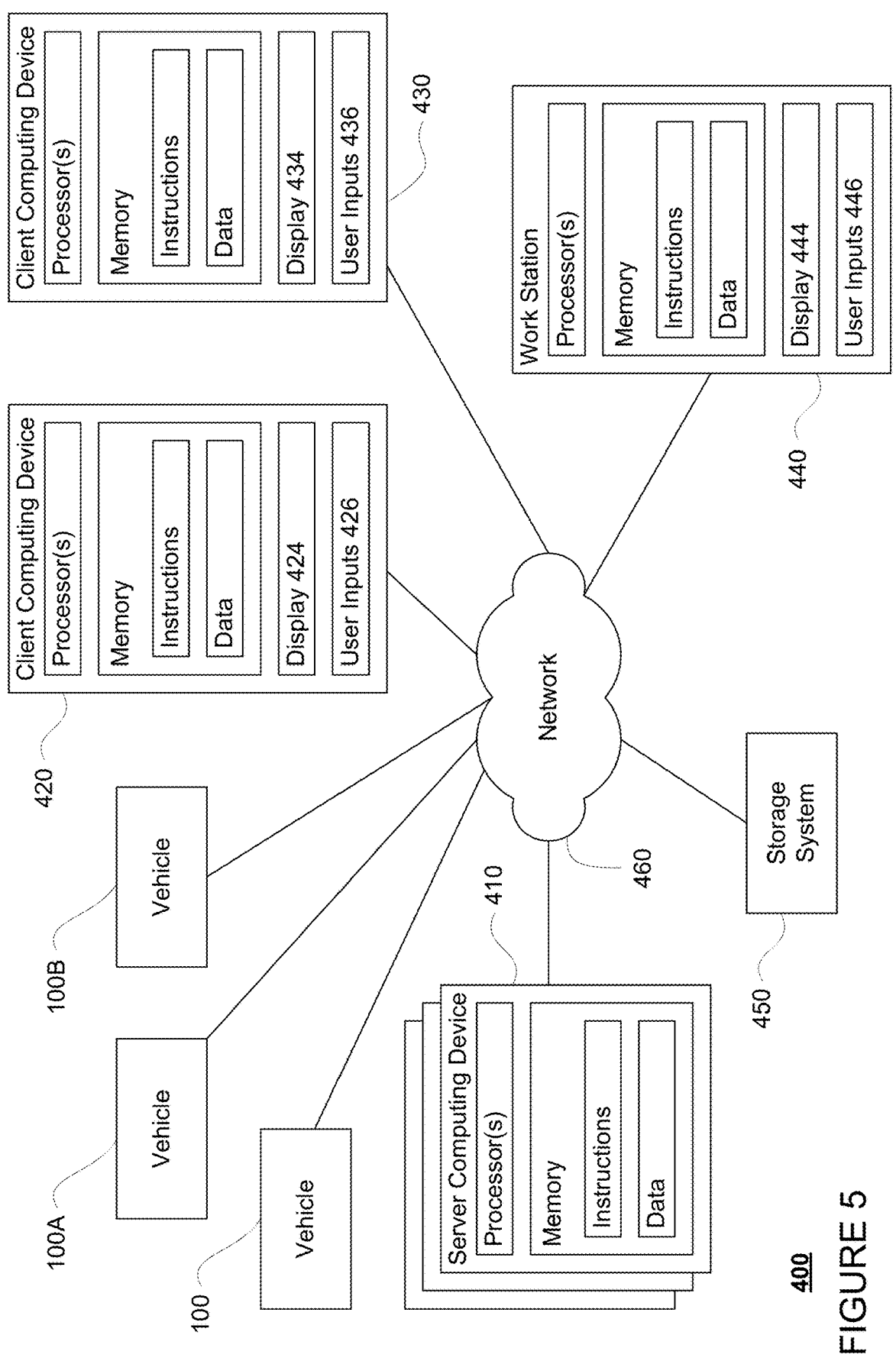
FIG. 5 is a functional diagram of the system of FIG. 4 in accordance with aspects of the disclosure.

Computing device 110 of autonomous vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes autonomous vehicle 100A and autonomous vehicle 100B, which may be configured the same as or similarly to autonomous vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of autonomous vehicle 100 or a similar computing device of autonomous vehicle 100A or autonomous vehicle 100B as well as computing devices 420, 430, 440 via the network 460. For example, autonomous vehicles 100, 100A, 100B, may be a part of a fleet of vehicles that can be dispatched by server computing devices to various locations.

In this regard, the server computing devices 410 may function as a fleet management system which can be used to track the status of autonomous vehicles of the fleet and arrange trips for passengers by assigning and dispatching vehicles such as autonomous vehicles 100, 100A, 100B. These assignments may include scheduling trips to different locations in order to pick up and drop off those passengers. In this regard, the server computing devices 410 may operate using scheduling system software in order to manage the aforementioned autonomous vehicle scheduling and dispatching. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430 may be a personal computing device intended for use by a user 422, 432 and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, such as a wristwatch as shown in FIG. 3. As an example the user may input information using a small keyboard, a keypad, microphone, using visual signals with a camera, or a touch screen. As yet another example, client computing device 440 may be a desktop computing system including a keyboard, mouse, camera and other input devices.

In some examples, client computing device 420 may be a mobile phone used by a passenger of a vehicle. In other words, user 422 may represent a passenger. In addition, client computing device 430 may represent a smart watch for a passenger of a vehicle. In other words, user 432 may represent a passenger. The client computing device 440 may represent a workstation for an operations person, for example, a remote assistance operator or someone who may provide remote assistance to an autonomous vehicle and/or a passenger. In other words, user 442 may represent an operator (e.g. operations person) of a transportation service utilizing the autonomous vehicles 100, 100A, 100B. Although only a few passengers and operations persons are shown in FIGS. 4 and 5, any number of such passengers and remote assistance operators (as well as their respective client computing devices) may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of computing devices 110, 410, 420, 430, 440, etc. Storage system 450 may store various types of information which may be retrieved or otherwise accessed by a server computing device, such as one or more server computing devices 410, in order to perform some of the features described herein.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

FIG. 9 is an example flow diagram 900 depicting an example method for sensor and environmental evaluation, which may be performed by one or more processors, such as the one or more processors 120 of the autonomous vehicle 100 or one or more processors of the perception system 174. As noted above, a fair weather reference map and LIDAR intensity comparison framework may be used to estimate the state of a sensor, and in particular a LIDAR sensor, and its external environment (e.g., the environment in which the autonomous vehicle 100 is currently driving). For instance, weather conditions in the environment of an autonomous vehicle as well as aperture fouling of a LIDAR sensor may affect the effective detection range or the range at which the LIDAR sensor can reliably produce sensor data and therefore the range at which the autonomous vehicle's perception system can reliably detect and identify objects.

For instance, if an autonomous vehicle is attempting to make a particular maneuver, detecting objects at various distances is critical to safely completing such maneuvers. For example, referring to FIG. 6A which corresponds to the map information 200, if autonomous vehicle 100 is attempting to make an unprotected turn from side street 250, detecting an approaching vehicle in lanes 220, 221, 222 or 223 at a certain distance D (e.g., within 170 meters, represented by area 600) is critical to determining the timing of the turn. If no object is detected this could mean that the autonomous vehicle 100 can turn or it could potentially mean that the autonomous vehicle's LIDAR sensor is not able to detect an object due to fouling on an aperture of the sensor (e.g., due to dirt, dust, water, and/or other debris on the aperture or protective lens) atmospheric conditions or atmospheric effects (e.g., fog precipitation, dust, steam, etc.) which are reducing the effective detection range (possibly over a subset of a field of view) of the LIDAR sensor, for example to distance G represented by area 610. In this regard, objects beyond area 610 but within area 600 may not be detected because the effective detection range of the LIDAR sensor is reduced. Moreover, as weather conditions change (clear to foggy, foggy to clear, etc.) and fouling conditions (wet to dry, dry to wet, clean to debris, etc.), the effective detection range of each LIDAR sensor of the autonomous vehicle 100 may change and may change quickly.

Figure 6A:
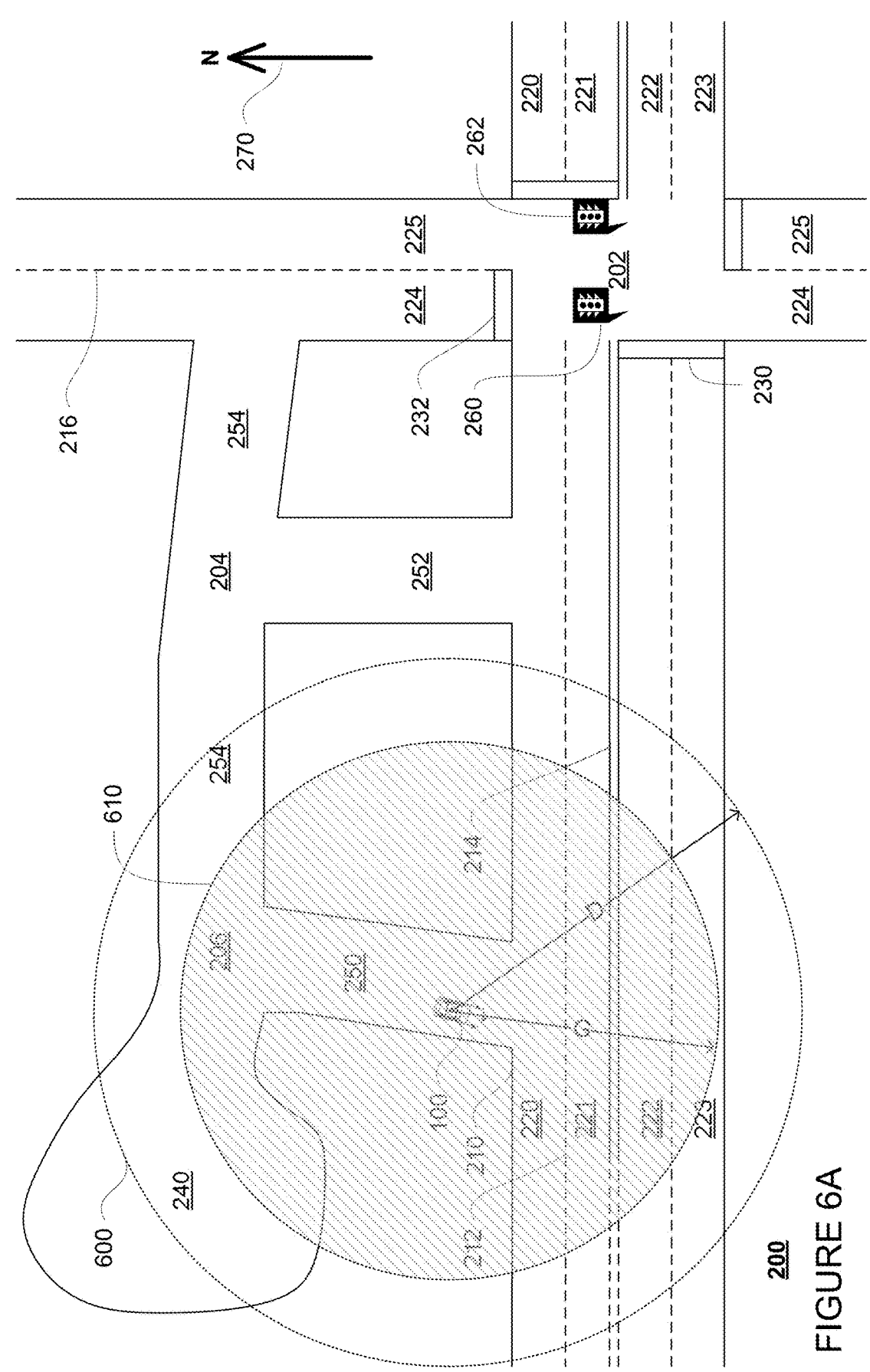
FIGS. 6A and 6B are example views of an autonomous vehicle driving in an environment in accordance with aspects of the disclosure.
Figure 6B:
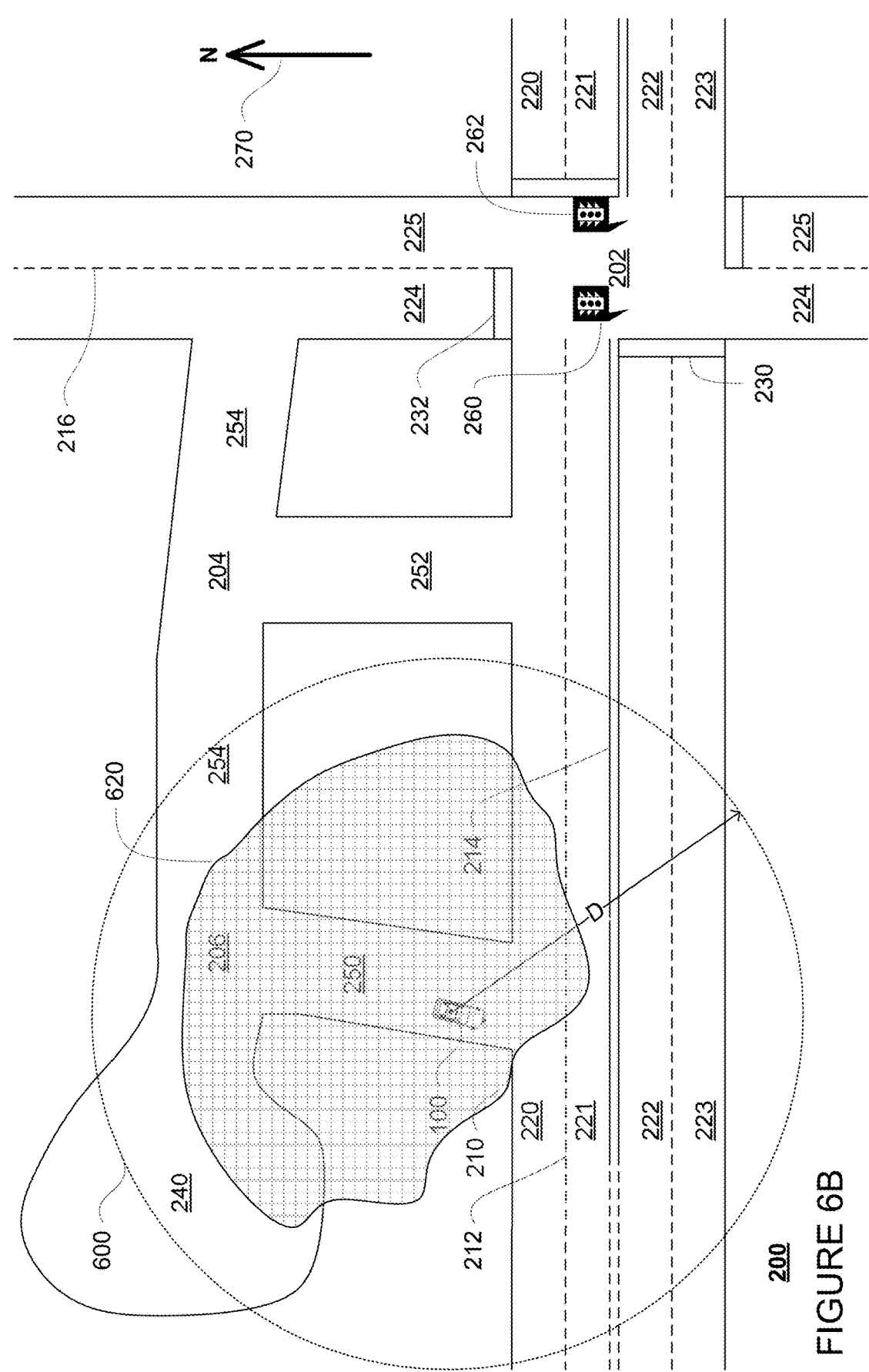

Although FIG. 6A represents a uniform reduction in the effective detection range, in some instances, the effective detection range will not be reduced uniformly, but rather only in certain directions due to weather conditions that vary in different directions in the environment. For instance, FIG. 6B represents a non-uniform reduction in the effective detection range resulting in area 620, where the effective detection range is reduced most in front of the autonomous vehicle (e.g., fog or other conditions are worse in front of the autonomous vehicle than behind) but in this case also behind the autonomous vehicle as well (potentially due to aperture fouling). The state of fouling on an aperture of each LIDAR sensor as well as atmospheric effects on each LIDAR sensor may be estimated and then used to determine an effective range of each LIDAR sensor. The effective range may correspond to a distance at which a particular LIDAR sensor meets certain threshold minimums. For example, the effective range for a LIDAR sensor may be defined as the distance at which the LIDAR sensor can produce data points with a 50% recall on a 5% Lambertian black target, where highly Lambertian surfaces are those that reflect light equally in all directions. When a LIDAR sensor sends a pulse of light in a particular direction, the LIDAR sensor waits a predetermined amount of time for the returned pulse to bounce off a surface in the environment and return to a receiver. After that predetermined amount of time, the receiver of the LIDAR sensor stops listening for this pulse. This predetermined amount of time may thus be a maximum listening time. This maximum listening range (max_listening_range) may be determined using the following equation:

$$\mathrm{max\_listening\_range} = \frac{c}{n} * \mathrm{max\_listening\_time}$$

where the max_listening_time is the maximum listening time, c is the speed of light, and n is the refractive index of air. The maximum listening range may represent an upper bound on recall range; no matter how reflective a surface is, the LIDAR sensor is not able to produce sensor data beyond this distance.

In some instances, at a certain point, a LIDAR sensor may saturate from all of the received samples for a given pulse, so the effective range may be derated appropriately for that pulse.

In order to do the aforementioned comparisons, a fair weather reference map may be generated. This may involve the server computing devices 410 processing log data stored in the storage system 450. This log data may be collected by LIDAR sensors of an autonomous vehicle, such as autonomous vehicle 100, through a geographic area during clear conditions where there is no fog, precipitation or other atmospheric or aperture fouling effects. The fair weather reference map may be generated using LIDAR returns and may thus include a three-dimensional (3D) geometric map that can associate intensity information with a location in 3D space. In this regard, the fair weather reference map may be configured as a surfel map, a triangle mesh, a map defined by truncated signed distance functions (TSDF), etc.

Thus, for example, the LIDAR returns which provide intensity and distance measurements may be summed and averaged in all directions and converted to surfels. In this regard, a surfel may correspond to a three-dimensional surface with an associated intensity value. A collection of such surfels for a geographic area may thus be considered a surfel map. Thus, the fair weather reference maps discussed herein may represent a three-dimensional map of expected intensity values for fair atmospheric conditions.

In the example of a fair weather reference surfel map, some of these surfels may be associated with additional information such as the type of object to which the surfel belongs. For example, some surfels may represent drivable road surfaces, non-drivable surfaces, lane lines, buildings or other structures. In this regard, a fair weather reference map may be filtered or limited to specific types of surfaces. As an example, a fair weather reference map may be limited to surfaces which are generally vertical (e.g., oriented in the gravitational direction), planar, and generally Lambertian such as buildings. Alternatively, the system may simply ignore surfels that are not generally vertical with respect to the direction of gravity or that do not appear Lambertian. This may allow for comparison of features, such as building walls which do not typically change much due to changes in atmospheric conditions (i.e., expected intensity values for vertical surfaces of buildings do not typically change much between fair and foggy or precipitation conditions). In addition, especially in geographic areas where there are few or no buildings (e.g., rural roads or interstate highways) the fair weather reference map may also include other surfaces which are unlikely to change much between fair and foggy or precipitation conditions such as reflective lane marker lines.

In some instances, certain types of surfaces that might otherwise meet the criteria described above may also be discarded for other reasons. For example, very thin, planar surfaces such as traffic signs, which may result in skewed values for angle of incidence due to their thinness may be discarded. In other words, it may be difficult to distinguish surfaces on the front and back of a stop sign, so these need not be included in the fair weather reference map. Similarly, surfaces which are likely to change quickly, such as those belonging to vegetation or surfaces which are highly speculative (high reflection) or not speculative (no reflection) need not be included in the fair weather reference map.

Returning to FIG. 9, at block 910, sensor data generated by a sensor of a perception system of an autonomous vehicle is received. The sensor data including distance and intensity information for a point in an environment of the autonomous vehicle. For instance, as an autonomous vehicle, such as vehicle 100, drives through the world, its perception system may collect data about its environment. For example, as noted above, the perception system 174 may include one or more LIDAR sensors, such as the LIDAR sensor of housing 312, 330, 332, which generate LIDAR sensor data (e.g., LIDAR data points or LIDAR returns).

Returning to FIG. 9, at block 920, an expected intensity is identified from a pre-stored fair weather reference map based on a location of the point. The return angle of reflected light and a distance for a LIDAR return may be used to determine a location (e.g., three-dimensional point in space) of a point on a surface in the autonomous vehicle's environment. The location of the point may be used to identify an expected intensity value from a fair weather reference map corresponding to the geographic area in which the autonomous vehicle is currently driving. The expected intensity value may be compared to the intensity of the LIDAR return. The comparison may be used to compute differences between the detected intensity value and the expected intensity value from the fair weather reference map. In this regard, the autonomous vehicle 100 may store a copy of the fair weather reference map generated by the server computing devices 410 in local memory. For instance, the server computing devices 410 may transmit all or a portion of the fair weather reference may to the computing devices 110 which may receive and store the fair weather reference map in the memory of the autonomous vehicle 100.

Returning to FIG. 9, at block 930, an effective detection range for the sensor may be determined dynamically based on the expected intensity and the intensity information for the point. For instance, differences described above may be used to estimate aperture fouling levels (e.g., how dirty or fouled the aperture of the LIDAR sensor is currently) and the meteorological optical range value of each LIDAR sensor. The aperture fouling levels may correspond to an aperture transmission value for a given point in time. For instance, aperture transmission values may be on a range from 0 to 1 (e.g., 0 being no transmission and being 100% transmission) and may quantify the amount of light loss due to aperture fouling (e.g., due to the aperture being dirty, wet, etc.) or rather how dirty or clean the aperture is currently. The aperture transmission values may thus change very quickly, over the course of a single rotation of a LIDAR sensor.

The meteorological optical range value may be defined as a distance and may range from 0 to infinity. This distance may be a proxy value for how fog or other atmospheric conditions affect a LIDAR sensor and may vary much more slowly than the aperture transmission value, such as over tens of seconds.

In the case of aperture fouling, as an autonomous vehicle gets closer to a vertical surface of a building, the intensity value for that building will not change. In other words, the aperture fouling level is a function of time and not a function of distance. If the aperture of a LIDAR sensor is dirty or wet, the LIDAR returns generated by the LIDAR sensor will have lower intensity regardless of the distance (i.e., the distance which the pulse of light traveled. However, in the case of fog or other atmospheric effects, the intensity values of the LIDAR returns are a function of both distance and time. For example, as the autonomous vehicle gets closer to a vertical surface of a building, the intensity values generated by a LIDAR sensor will increase as the loss due to fog decreases corresponding to Koschmieder's Law (e.g., visibility is inversely proportional to the extinction coefficient of air).

The combination of aperture transmission values and the meteorological optical range values may be used to estimate how much the overall intensity attenuation is expected at a given point in time and distance from the LIDAR sensor. The overall intensity attenuation M for a LIDAR sensor that rotates and generates sensor data for a 360 degree field of view (such as the LIDAR sensor of housing 312) may be determined using the equation:

$$M(t, r) = A(t)e^{-6* \frac{r}{eMOR(t)}}$$

In this example, M(t, r) represents the intensity attenuation expected at time t and at range r. The function A(t) represents the aperture transmission value at time t, and the function eMOR(t) represents the estimated meteorological optical range value at time t. Similarly, the overall intensity attenuation M for a LIDAR sensor that rotates and generates sensor data for a less than 360 degree field of view (such as the LIDAR sensors of housings 330, 332) may be determined using the equation:

$$M(t, r, \theta_{shot\_pitch}) = A(t, \theta_{shot\_pitch})e^{-6* \frac{r}{eMOR(t)}}$$

In this example, the aperture transmission value is now a function of time t and $\theta_{shot\_pitch}$. $\theta_{shot\_pitch}$ represents the angle of the beam as it leaves the aperture of the LIDAR sensor. Although the foregoing equations focus on the LIDAR sensor that generates sensor data for a 360 degree field of view, the foregoing equations may be adjusted in order to take $\theta_{shot\_pitch}$ into account as well for LIDAR sensors which generate sensor data for less than a 360 degree field of view.

On a clear day with an unfouled, dry aperture, the overall intensity attenuation M would be expected to be close to some minimum or even zero. For instance, if the overall intensity attenuation is normalized to scale of 0 to 1, the minimum would be zero and the maximum value would be 1. If the aperture is dirty or wet on a clear day, the overall intensity attenuation would be expected to be close to some minimum value less than 1, but greater than 0 (assuming some light is always received) or rather, some fixed value less than 1.

Each LIDAR return may provide information such as location of a point on a surface from which the light pulse was reflected, the intensity for the point, a timestamp, a range or distance from the LIDAR sensor to the point, and an angle of incidence. In this regard, the intensity value may represent the amount of light reflected from a surface at that point or the reflectivity of that surface. Based on the distance and location, a corresponding surfel and associated intensity may be identified from the fair weather reference map. The angle of incidence may also be used to determine the angle of the light pulse relative to the surfel's surface normal.

For each LIDAR return, the associated intensity from the reference map should approximately equal the intensity for the point after compensating for the overall intensity attenuation. For example, when using a surfel reference map, the associated intensity will be a surfel intensity. For instance, a LiDAR point i with location $p_i$ (which may be defined in a three-dimensions such as x, y, and z) is measured with intensity $I_i$ on a surface of a building at a range of $r_i$ at time $t_i$. The location of the LIDAR point can be used to query the fair weather reference map to identify the reference or (e.g., surfel from a surfel reference map) that lies exactly at the three-dimensional location $p_i$. The identified reference will be associated with a fair weather intensity value of $S_i$. This value of $S_i$ may be compared against $I_i$, and the error or difference between these values as well as other information may be used to estimate aperture transmission value $A(t_i)$, meteorological optical range value $eMOR(t_i)$, and overall intensity attenuation $M(t_i, r_i)$ for that LIDAR sensor.

Using this example, a point to map reference relationship, or for example a point to surfel relationship when utilizing a surfel map, may then be defined using the equation:

$$\frac{I_i}{M(t_i, r_i)} = S_i$$

This equation may represent an approximation as intensity measurements can be noisy and exhibit channel-to-channel bias. Moreover, since each surfel of the fair weather reference map only stores a single intensity value, it may be difficult to account for angle of incidence as such, limiting the fair weather reference map to surfaces which are vertical or nearly vertical and expected to be Lambertian may be especially useful. In this regard, certain types of objects which are highly non-Lambertian (e.g., parked vehicles, shiny windows, wet road patches, metal poles, etc.) can be excluded from the analysis (and would not be included in the fair weather reference map) and therefore ignored. As such, the LIDAR returns used may be filtered to remove those that do not have correspondences in the fair weather reference map.

A point to point relationship may also be defined. A voxel grid of some larger dimension (e.g., 30 cm or more or less) may be used to accumulate LIDAR returns and identify correspondences for a given LIDAR sensor or sensors. If there are k number of LIDAR points within the same voxel, then the following assumption can be made:

$$\frac{I_1}{M(t_1, r_1)} = \dots = \frac{I_i}{M(t_i, r_i)} = \dots = \frac{I_k}{M(t_k, r_k)}$$

Note that this equation ignores underlying reflectance of the material, which may be acceptable here given the characteristics of the surfaces in the fair weather reference map (e.g., generally vertical, planar, Lambertian, etc.). In some instances, voxels that do not meet certain criteria (e.g., corresponding to a single surface, a single type of surface—such as a window versus a non-window surface on a building, a planar surface, etc.) may be discarded.

In order to solve for the aperture transmission value and meteorological optical range value over a given interval of time (e.g., $[t_{min}, t_{max}]$), an objective function which utilizes the point to surfel and point to point relationships described above may be used. The parameterization may estimate a scalar value for each timestamp. For instance, A(t) may be assumed to be a piecewise constant function (vector) with values $A=A_1, A_2, \dots, A_N$ at times or timestamps $T=t_1, t_2, \dots, t_N$, respectively. Similarly, eMOR(t) may be assumed to be a piecewise constant function (vector) with values $E=eMOR_1, eMOR_2, \dots, eMOR_N$. Accordingly, an objective function may be defined as:

$$\min A, E \sum_{i=1}^{N_{ps}} \left| \frac{I_i}{M(t_i, r_i)} - S_i \right|^2 + \sum_{(a,b) \in C}^{N_{pp}} \left| \frac{I_a}{M(t_a, r_a)} - \frac{I_b}{M(t_b, r_b)} \right|^2$$

In this example, M(t,r) is implicitly dependent on A and E. The value C represents all pairs of point indices (a, b) that are in correspondence (e.g., correspond to the same location but generated at different times). In this example, Npp may represent the total number of point to point relationship pairs that can be built, and Nps may represent the total number of point to surfel relationship pairs that can be built. A batch estimation of the aperture transmission value and meteorological optical range value which sets these relationships closest to zero may then be determined.

Figure 7:
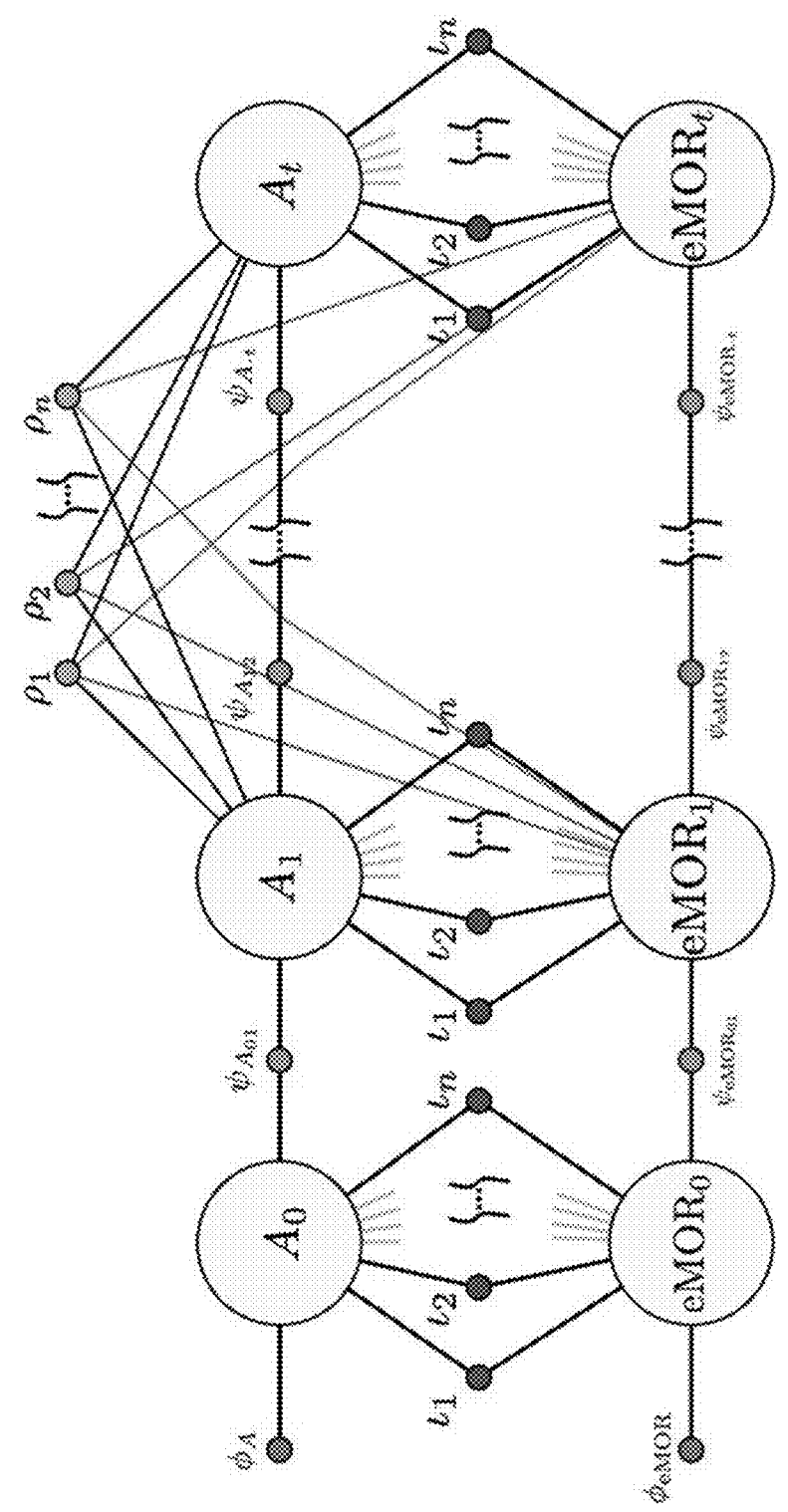
FIG. 7 is a representation of a factor graph optimization in accordance with aspects of the disclosure.

Alternatively a factor graph optimization 700 may be used as depicted in FIG. 7. The components of the graph may include the variables to be estimated in the larger circles (e.g., $A_0, A_1 \dots A_t$, $eMOR_0$, $eMOR_0 \dots eMOR_N$, etc.), and the smaller nodes which represent constraints (e.g., $l_1, l_2, \dots l_N$, $\rho_1, \rho_2 \dots \rho_N$, etc.) between these variables. In this example, each timestep (0, 1 . . . t) may correspond to a single 360 degree rotation of the LIDAR sensor.

Following the relations described in FIG. 7, the constraints may be expressed as nonlinear Gaussian factors. For example, an intensity factor $l_i$ may be expressed as:

$$l_i \propto \exp\left\{ -\frac{1}{2} \left\| \frac{z_{I_i}}{M\left(A_i, eMOR_i, z_{r_i}\right)} - z_{s_i} \right\|^2_{\sigma_i} \right\}$$

In this example, $\sigma_i$ represents uncertainty in the measurement of factor $l_i$ (and may be determined based on the characteristics of the sensor which generated the measurement), $z_{I_i}$ represents the measured intensity at point i, $z_{r_i}$ represents the effective detection range for point i, and $z_{s_i}$ represents the measured intensity for the corresponding surfel for the point i determined from the fair weather map information.

In addition, leveraging the point to point relationship assumption above, a point to point relationship or correspondence factor $p_{ij}$ may be expressed as:

$$p_{ij} \propto \exp\left\{-\frac{1}{2}\left\|\frac{z_{I_i}}{M\left(A_i,\, eMOR_i,\, z_{r_i}\right)} - \frac{z_{I_j}}{M\left(A_j,\, eMOR_j,\, z_{r_j}\right)}\right\|_{\sigma_{ij}}^2\right\}$$

In this example, i and j represent non-adjacent timesteps. Utilizing constraints between non-adjacent timesteps may allow for the imposition of loop-closures within the problem formulation, which may be an effective way to get a better global consensus on any estimates for aperture transmission value, meteorological optical range value, and overall intensity attenuation for that LIDAR sensor as well as avoid drift.

In addition, one or more random walk constraints for time propagation $\psi_{ij}$ may be expressed as:

$$\psi_{ij} \propto \exp\left\{-\frac{1}{2}\|x_j - x_i\|_{\sigma_{ij}}^2\right\}$$

This constraint may represent "dynamics" of aperture transmission value and meteorological optical range value or how these change over time or vary between two adjacent timestamps. In this regard, the variable x may represent a prior estimated value for meteorological optical range value (e.g., eMOR(t)) or aperture transmission (e.g., A(t)). In this example, $\sigma_{ij}$ represents uncertainty in the factor $\psi_{ij}$. Since meteorological optical range value eMOR(t) is likely to change slowly over time, $\sigma_{ij}$ may be set for a smaller value than the uncertainty values for the aperture transmission value A(t).

As an example, when variable x represents a prior estimated value for aperture transmission (e.g., A(t)), then the uncertainty $\sigma_{ij}$ may represent the dynamics of how adjacent timesteps evolve along the variable x. Particularly for aperture transmission, there may be very little correlation between timesteps. As such, the uncertainty $\sigma_{ij}$ may be relatively large to account for situations in which the LIDAR sensor is suddenly sprayed with water or other fluid resulting in a dramatic difference in aperture transmission (e.g., A(t)) for the timesteps immediately before and after. At the same time, when variable x represents a prior estimated value for meteorological optical range value eMOR(t), then the uncertainty $\sigma_{ij}$ may represent the dynamics of how environmental conditions change over time (e.g., how fog evolves over time). As a result, the uncertainty $\sigma_{ij}$ may be relatively small as environmental conditions are less likely to change dramatically between timesteps (e.g., there is more likely to be a gradual change or many timesteps).

In addition, one or more prior factors constraints $\phi_x$ may be expressed as:

$$\phi_x \propto \exp\left\{-\frac{1}{2}\|x - z_x\|_{\sigma_x}^2\right\}$$

In this example, because the factor graph optimization is a probabilistic formulation, $\phi_x$ may represent initial conditions for a given variable x. As noted above, this variable may represent a prior estimated value for meteorological optical range value (e.g., eMOR(t)) or aperture transmission (e.g., A(t)). In this regard, $z_x$ may represent a prior measurement, and $\sigma_x$ may represent prior uncertainty assigned to this term.

For instance, the prior measurement may be a prior estimated meteorological optical range value. For example, on a fair or clear weather day, the prior estimated meteorological optical range value may be set to 2000 meters, and on a very foggy day, the prior estimated meteorological optical range value may be set to some much lower value such as 100 meters or more or less to ensure that the optimization is within a reasonable range of values. In another instance the prior measurement may be a prior estimated aperture transmission value. For instance, if there is no aperture fouling, the prior estimated aperture transmission value may be set to some value close to 1 (such as 1, 0.9 or 0.8), and if there is a lot of aperture fouling, the prior estimated aperture transmission value may be set to some value closer to zero (e.g., 0.1 or 0.01), again to ensure that the optimization is within a reasonable range of values.

These factors can then be solved using a standard nonlinear least squares solver such as Ceres Solver.

As an alternative, because the optimization problem is linear in log space, an approach which solves for log intensities (e.g., solves for log of the aperture transmission value and log of the meteorological optical range value. Because the error in photon (and therefore intensity) estimation increases with increasing photons, until approximately less than 10'photons, where photon estimation is very unreliable, and the error distribution is more likely to be uniform.

Figure 8:
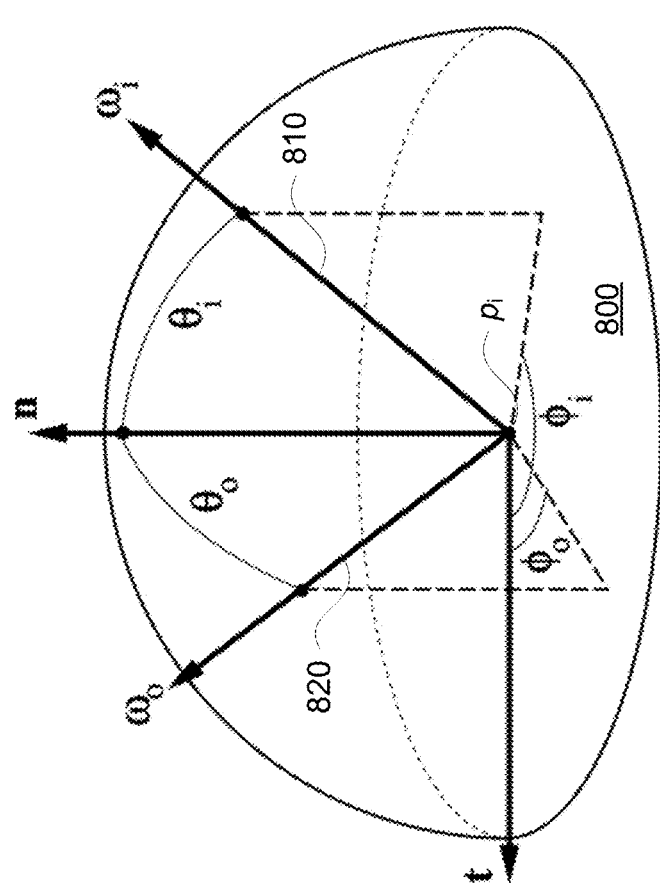
FIG. 8 is an example representation of a surface and reflected light in accordance with aspects of the disclosure.

As another alternatively, per-voxel reflectance information for the fair weather reference map may be pre-computed using the bidirectional reflectance distribution function (BRDF) though this may be computationally expensive. FIG. 8 is an example representation of a surface 800 and light 810, 820 in accordance with aspects of the disclosure. Referring to FIG. 8, where n represents a surface normal for the point $p_i$ and t represents time, given an incident light 810 direction co and an outgoing light 820 direction $\omega_o$, the BRDF returns the ratio of reflected spectral radiance scattered along $\omega_o$ to the irradiance incident from $\omega_i$. The BRDF has units of steradians-1 and can be expressed as a function of 5 variables including wavelength of the light $\lambda$. For instance, two angular variables $\theta_i$ and $\phi_i$ may be used to describe the incident direction co, and two angular variables $\theta_0$ and $\phi_0$ may be used to describe the outgoing direction $\omega_o$. Thus, the BRDF may be described using a function: $f_r(\theta_i, \phi_i, \theta_0\theta_j, \lambda)$.

Estimating the BRDF may be based on a series of assumptions. Because LIDAR sensors typically operate at a fixed wavelength, wavelength-dependence can be ignored. In addition, if the transmitter and receiver of the LIDAR sensor are very close to one another, the values of the incoming light direction and outgoing light direction can be assumed to be roughly equal or rather, $\omega_o = \omega_i$. In addition, most materials are assumed to be isotropic (rather than anisotropic) to reduce complexity. Anisotropic materials (ex: brushed metal) are rare in environments in which autonomous vehicles as described herein may typically operate. Given these assumption, the BRDF may be considered a one-dimensional function of the angle between $\omega_o$ (or $\omega_i$) and the surface normal n. For isotropic materials, the BRDF may be described as a function, $f_r(\theta_i, \theta_0, \phi_i - \phi_o)$.

In this regard, to incorporate non-Lambertian materials, a parameterized version of each voxel's BRDF may be solved for as well based on the point to point relationship. For instance, using the assumption $\omega_o = \omega_i$ as described above, a further assumption, $\phi_i = \phi_o$, may also be made for the same reason. For the case in which $\theta_i = \theta_0$, BRDF may be considered a one-dimensional function, $f_r(\theta)$. Given these assumptions, an analytical model for each voxel's one-dimensional BRDF may be represented by $B(\theta)$ where the $i^{th}$ voxel's BRDF may be represented by:

$$B_i(\theta, \beta_i) = \beta_i$$

In this example, $\beta_i$ is a parameter vector that must be fit for each voxel. Given this, the point to point relationship can be generalized to handle non-Lambertian materials as represented below:

$$\frac{I_1}{M(t_1, r_1)\cos(\theta_1)B_1(\theta_1, \beta_1)} = \ldots =$$

$$\frac{I_i}{M(t_i, r_i)\cos(\theta_i)B_i(\theta_i, \beta_i)} = \ldots = \frac{I_k}{M(t_k, r_k)\cos(\theta_k)B_k(\theta_k, \beta_k)}$$

Using this formulation, the parameters of an analytical model may be solved for which approximate the BRDF at each voxel in the scene. Various common analytical BRDF models may be used depending on the types of materials expected to be observed, ease of fitting the model's parameters, etc.

Thus, as described above, a meteorological optical range value may be estimated for each three-dimensional point corresponding to a detected surface in the autonomous vehicle's environment. This may correspond to the effective detection range of the autonomous vehicle's LIDAR sensor or sensors for a given direction (corresponding to the surface) and point in time. In addition, the meteorological optical range value may be used to generate a three-dimensional map of the effective detection range of the autonomous vehicle's LIDAR sensor or sensors for a given point in time in three-dimensional space. In some instances, to reduce computational complexities, the meteorological optical range value (e.g., eMOR(t)) may be converted to a single scalar value for an entire scene or an effective detection range for an entire scene taking an average or mean, median, using the lowest or highest value, etc. of all of the meteorological range values for a given timestamp or period of time (e.g., corresponding to a single 360 degree rotation of a LIDAR sensor). Again, the results may be an effective detection range for the LIDAR sensor at the point in time the sensor data was generated.

However, because certain atmospheric effects may differ greatly around a given location (e.g., there may be more fog in front of the autonomous vehicle than behind), taking an average across a 360 degree field of view around the autonomous vehicle to determine a single scalar value may not be helpful. In other words, a single scalar value may be less useful as it essentially assumes that the autonomous vehicle is operating in homogenous atmospheric conditions (e.g., foggy or raining in all directions). Thus, the effective detection range may be limited to one or more certain fields of view such as 180 degrees to the front, sides, or rear (behind) the autonomous vehicle. Greater or smaller fields of view (e.g., 270, 90, 60, 30 degrees or more or less) may also be used to generate effective detection range.

Returning to FIG. 9, at block 940, a behavior of the autonomous vehicle is controlled based on the effective detection range. As noted above, the meteorological optical range value or values may correspond to an effective detection range for the LIDAR sensor for a given direction and point in time when the sensor data was generated by the LIDAR sensor and/or may be averaged together to determine an effective detection range. In this regard, over time, as additional sensor data is generated, updated versions for the effective detection range.

Such behaviors may include, for example, cleaning as well as driving behaviors (e.g., planning and routing behaviors) as discussed further below. For instance, if the aperture transmission value (e.g., A(t)) falls below a first threshold, one or more processes for cleaning the LIDAR sensor or sensors may be initiated. This may involve spraying water or other cleaning fluid, puff of air, and/or using a wiper, etc. Activating the cleaning processes in this way may reduce unnecessary waste of resources (e.g., if limited fluid or puffs of air are available). If the aperture transmission value improves, the cleaning may be repeated or stopped as needed (e.g., until the aperture transmission value is greater than the first threshold). If the aperture transmission value does not improve or gets worse (e.g., falls below a second threshold), the computing devices 110 may control the autonomous vehicle to automatically pull over and stop, request remote or roadside assistance (e.g., to check or further clean the LIDAR sensor), and/or take other remedial action. In some instances, improvements in the aperture transmission value after cleaning may be used to assess the effectiveness of the cleaning processes and/or to assess the effectiveness of certain hydrophobic or hydrophilic coatings on aperture fouling levels.

In other instances, meteorological optical range value may then be used to control the autonomous vehicle 100. For example, the meteorological optical range map or any of the aforementioned effective detection range may be input into the planning system 168 and used to generate trajectories. In this regard, as the effective detection range value decreases in front of and/or behind the autonomous vehicle, it may take more time for the autonomous vehicle to detect and identify objects (e.g., other road users such as vehicles, bicyclists and pedestrians) in front and behind the autonomous vehicle. As such, the autonomous vehicle may be slowed down to provide more time to detect and identify such objects. Similarly, if the stopping distance for a particular speed is greater than the effective detection range value in front of the autonomous vehicle, then the autonomous vehicle may be slowed down until the stopping distance for the slower speed is less than the effective detection range value in front of the autonomous vehicle. Thus, in such examples, the planning system may generate trajectories which reduce and/or limit the autonomous vehicle's speed. In other examples, the planning system may prohibit certain maneuvers when planning trajectories, such as unprotected turns, k-turns, U-turns, reversing, etc., if the effective detection range is less than some minimum threshold value.

In addition or alternatively, the effective detection range may be input into the routing system and used to generate routes. For example, the routing system may avoid certain types of roads (e.g., roads with speed limits greater than 35 miles per hour) if the effective detection range is less than some minimum threshold value.

In some instances, the computing devices 110 may provide information about any of the aforementioned the effective detection range value to a remote server computing device. If any of the aforementioned values becomes too low (e.g., is less than some predetermined threshold amount such as 50, 100, 200 meters or more or less), the server computing devices may require all autonomous vehicles of a fleet of autonomous vehicles to come to a stop for safety reasons (e.g., "ground the fleet").

In some instances, the effective detection range values and aperture fouling levels generated by an autonomous vehicle may be compared over time. These may be analyzed to determine whether, how and how quickly a LIDAR sensor degrades over time for a given trip, week, month, etc. This may also be used to provide an estimate of whether or when the LIDAR sensor may no longer be performing to a minimum required standard for the autonomous vehicle. In such situations, the autonomous vehicle may pull over or stop before a LIDAR sensor becomes dangerously degraded rather than in response to it.

Although the features herein are described in relation to a fully autonomous driving mode, all or some aspects of the disclosure may be used in conjunction with partially autonomous driving modes and/or manual driving models. For instance, aperture fouling values, meteorological optical range values, and/or effective detection range may be used to provide driver assistance by controlling a vehicle to avoid a collision or other situation and/or to signal a driver or other person in the vehicle to various information such as by visual or audible notifications provided via a display or speakers of the vehicle (e.g., autonomous vehicle 100 or another vehicle with only partially autonomous driving modes and/or manual driving models). For example, if there is sufficient aperture fouling, this may reduce the ability of the vehicle's perception system to detect objects and use certain features such as automatic braking. In this regard, a notification may provide a warning or driving suggestion to a driver such as: "careful, pretty low visibility being detected, we suggest driving at a max speed of 45 mph or below" or similar.

The features described herein may provide a framework that may be used to estimate the state of a sensor, and in particular a LIDAR, and its environment dynamically or in real time. This may enable more precise identification of atmospheric conditions as well as aperture fouling levels, which in turn, may be used to improve safety while driving, better allocate resources for cleaning as well as to determine a range at which the autonomous vehicle's perception system can reliably detect and identify objects.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only some of many possible embodiments. Further, the same reference numbers in different drawings can identify the same or similar elements.

The invention claimed is:

1. A method comprising:
receiving, by one or more processors, sensor data generated by a LIDAR sensor of a perception system of an autonomous vehicle, the sensor data including distance and intensity information for a point in an environment of the autonomous vehicle;
identifying, by the one or more processors, an expected intensity at a location of the point from a pre-stored fair weather reference map;

dynamically determining, by the one or more processors, an effective detection range of the LIDAR sensor by comparing the expected intensity at the location of the point to the intensity information for the point, wherein the effective detection range corresponds to a distance at which the LIDAR sensor detects an object and identifies one or more characteristics of the object according to one or more threshold minimums, wherein the one or more threshold minimums include a percentage recall on a Lambertian target; and
controlling, by the one or more processors, a behavior of the autonomous vehicle based on the effective detection range.

2. The method of claim 1, wherein the pre-stored fair weather reference map includes surfels corresponding to surfaces of buildings.

3. The method of claim 2, wherein the pre-stored fair weather reference map includes surfels corresponding to surfaces which are generally vertical.

4. The method of claim 2, wherein the pre-stored fair weather reference map includes surfels corresponding to surfaces which are planar.

5. The method of claim 2, wherein the pre-stored fair weather reference map includes surfels corresponding to surfaces which are generally Lambertian.

6. The method of claim 1, further comprising:
determining an aperture transmission value based on the expected intensity and the intensity information for the point;
comparing the aperture transmission value to a threshold value; and
based on the comparison, activating a cleaning process for the LIDAR sensor.

7. The method of claim 1, further comprising, determining a meteorological optical range value for the point using the expected intensity and the intensity information for the point, and wherein determining the effective detection range includes determining the effective detection range using the meteorological optical range value.

8. The method of claim 7, further comprising generating a meteorological optical range map based on the meteorological optical range value and at least one other meteorological optical range value, and wherein controlling the behavior of the autonomous vehicle is further based on the meteorological optical range map.

9. The method of claim 1, further comprising, determining an updated effective detection range based on updated sensor data.

10. The method of claim 1, wherein the Lambertian target is a Lambertian black target.

11. The method of claim 1, wherein the percentage recall on the Lambertian target is 50% recall on a 5% Lambertian black target.

12. A system comprising one or more processors configured to:
receive sensor data generated by a LIDAR sensor of a perception system of an autonomous vehicle, the sensor data including a distance for a point in an environment of the autonomous vehicle and intensity information for the point;
identify an expected intensity at a location of the point from a pre-stored fair weather reference map;
determine a meteorological optical range value for the point using the expected intensity at the location of the point and the intensity information for the point, the meteorological optical range value being a distance representative of an effect of one or more atmospheric conditions on the LIDAR sensor;

dynamically determine an effective detection range for the LIDAR sensor based on:

a comparison of the expected intensity to the intensity information for the point, wherein the effective detection range corresponds to a distance at which the LIDAR sensor detects an object and identifies one or more characteristics of the object according to one or more threshold minimums; and the meteorological optical range value; and control a behavior of the autonomous vehicle based on the effective detection range.

13. The system of claim 12, wherein the pre-stored fair weather reference map includes surfels corresponding to surfaces of buildings.

14. The system of claim 13, wherein the pre-stored fair weather reference map includes surfels corresponding to surfaces which are generally vertical.

15. The system of claim 13, wherein the pre-stored fair weather reference map includes surfels corresponding to surfaces which are planar.

16. The system of claim 13, wherein the pre-stored fair weather reference map includes surfels corresponding to surfaces which are generally Lambertian.

17. The system of claim 12, wherein the one or more processors are further configured to determine an aperture transmission value based on the expected intensity and the intensity information for the point;

compare the aperture transmission value to a threshold value; and control the behavior by activating a cleaning process for the LIDAR sensor based on the comparison.

18. The system of claim 12, wherein the one or more processors are further configured to generate a meteorological optical range map based on the meteorological optical range value and at least one other meteorological optical range value, and wherein controlling the behavior of the autonomous vehicle is further based on the meteorological optical range map.

19. A non-transitory, tangible, computer-readable medium on which instructions are stored, the instructions, when executed by one or more processors, cause the one or more processors to implement a method, the method comprising:

receiving sensor data generated by a LIDAR sensor of a perception system of an autonomous vehicle, the sensor data including distance and intensity information for a point in an environment of the autonomous vehicle;

identifying an expected intensity at a location of the point from a pre-stored fair weather reference map;

dynamically determining an effective detection range of the LIDAR sensor by comparing the expected intensity at the location of the point to the intensity information for the point, wherein the effective detection range corresponds to a distance at which the LIDAR sensor detects an object and identifies one or more characteristics of the object according to one or more threshold minimums, wherein the one or more threshold minimums include a percentage recall on a Lambertian target; and controlling a behavior of the autonomous vehicle based on the effective detection range.

* * * * *